US009453316B1

(12) United States Patent
Cadogan et al.

(10) Patent No.: US 9,453,316 B1
(45) Date of Patent: Sep. 27, 2016

(54) EXTENDIBLE FLEXIBLE FLOOD BARRIER

(71) Applicant: ILC DOVER LP, Frederica, DE (US)

(72) Inventors: David Phillip Cadogan, Middletown, DE (US); Jonathan Michael Hinkle, Middletown, DE (US); Jeffrey Lewis Roushey, Milton, DE (US)

(73) Assignee: ILC DOVER LP, Frederica, DE (US)

( * ) Notice: Subject to any disclaimer, the term of this patent is extended or adjusted under 35 U.S.C. 154(b) by 0 days.

(21) Appl. No.: 14/675,286

(22) Filed: Mar. 31, 2015

(51) Int. Cl.
*E02B 3/12* (2006.01)
*E02B 3/10* (2006.01)

(52) U.S. Cl.
CPC .............. *E02B 3/122* (2013.01); *E02B 3/106* (2013.01)

(58) Field of Classification Search
USPC .............. 405/80, 107, 113, 115; 256/13, 45; 52/202
See application file for complete search history.

(56) References Cited

U.S. PATENT DOCUMENTS

| | | | |
|---|---|---|---|
| 6,460,299 B1 | 10/2002 | Burrow | |
| 6,567,341 B2* | 5/2003 | Dreyer | B63G 13/02 181/296 |
| 7,178,792 B2 | 2/2007 | Monahan et al. | |
| 2008/0247825 A1 | 10/2008 | Bonds | |
| 2011/0296774 A1 | 12/2011 | Tremaine, III et al. | |
| 2012/0207545 A1 | 8/2012 | Bouchard et al. | |
| 2012/0230768 A1* | 9/2012 | Rowland | E02B 3/106 405/114 |
| 2012/0291355 A1* | 11/2012 | Cloninger | A62C 2/10 49/348 |
| 2013/0094906 A1* | 4/2013 | Rijlaarsdam | E02B 3/10 405/115 |
| 2014/0110066 A1 | 4/2014 | Rijlaarsdam | |

OTHER PUBLICATIONS

International Search Report Dated Sep. 1, 2015.

* cited by examiner

*Primary Examiner* — Sean Andrish
(74) *Attorney, Agent, or Firm* — Polsinelli PC

(57) ABSTRACT

A novel extendible flexible flood barrier manufactured from textile and membrane materials has been developed which comprises a textile/membrane wall and support posts configured to be movable between a stowed position and a deployed position and wherein, in the deployed position, forms a leak-free barrier against flood water or other fluids. The flexible wall is stored in a container on one side of the opening to be protected and extended to the receiver on the opposite of the opening to deploy the barrier. Structural members, such as posts or a building itself will react to the load from the flood water impinging on the wall. Intermediate posts or bollards can be added to lengthen the wall so larger spans can be closed-off with the flexible wall. The flexible wall can be configured for use in many applications including entire buildings, building entrances, transit system passages, such as ventilation shafts or elevator shafts, stairwells, and other openings that can be threatened by flooding.

20 Claims, 9 Drawing Sheets

EXTENDIBLE FLEXIBLE FLOOD BARRIER

FIELD OF THE INVENTION

The present invention relates to an extendible flexible flood barrier system that is scalable in size, shape, and orientation to a wide variety of applications. The invention can be used to seal part or all of an opening from flood water or other fluid threats, or completely surround a building or structure for protection.

BACKGROUND OF THE INVENTION

Flooding events can be precipitated by natural and manmade inputs. These events can be particularly challenging for buildings and infrastructure located at or near a body of water. Transportation systems or buildings in these areas that are below the normal waterline are particularly vulnerable. Severe storms with high tidal surges or flash floods, rising sea levels, and seismic activity are some of the challenges posed by nature. Accidents, terrorism, and mechanical failures are manmade threats that can cause flooding, or magnify flooding from natural events.

Many subway and vehicular tunnels that operate below waterline around the world have experienced flooding. Countless buildings and structures such as power substations have also experienced flooding. Hurricane Sandy was particularly devastating to New York City in 2012 because a significant portion of the subway system was flooded and economic losses were unprecedented. Water entrance points included subway portals, stairwell entrances, ventilation shafts, emergency exits, and elevator shafts. Vehicular tunnels were also flooded, as well as many buildings. This was one of the worst flooding events in a large city in history, but it was just one in a string of events in subway systems in major cities around the world.

There are many types of flood mitigation wall systems available commercially. This includes sand bags, inflatable walls, deployable mechanical walls, and flood doors. Most of these devices are stored remotely and transported to the point of use when needed. This requires the user to have extensive logistical plans and training in place to provide effective protection. These wall systems are also labor intensive and time consuming to deploy, especially when under threat of a storm when personnel are busy with many tasks. Also, since most deployable wall systems have numerous components there is a considerable risk of difficulties from improper assembly that can result in leakage or failure of the wall. Mechanical systems such as rigid doors that are stored at point-of-use solve some of the issues with deployable wall systems but often require significant modification to the infrastructure during installation, a considerable amount of storage space for concealment, frequent maintenance, and are costly to install. They are also limited in the span of opening they are attempting to close off. Because of this, they are often found to be unacceptable in numerous applications.

Textile and membrane based flexible flood mitigation walls offer significant benefits over the existing wall devices. Most notable is the ability to pack the wall system into a small volume for point-of-use storage. This not only allows the flexible flood mitigation wall to be stored in a small volume that is compatible with space available, but it also minimizes the modifications required on the infrastructure to install it. The membrane wall itself is shaped to minimize stress in the material (governed by thin-walled pressure vessel equations, specifically pressure and radius).

The wall is deployed by first removing the cover over its storage container which is attached to a perimeter wall or building adjacent to the opening. The fabric wall, which is attached and sealed to the anchor post, is then extended and attached to the receiver post. The ground skirt is positioned against the ground and the wall is ready to retain fluid pressure. In the case of more dynamic events or when reducing leakage is critical, the skirt may be fastened under clamping bars to compress a seal and fix the base of the wall to the ground. In this case pre-installed receivers for mounting bolts are required.

In the case of longer span walls, intermediate posts can be deployed to support the wall intermittently, or preinstalled bollards can be used. Prior to deploying the fabric wall, cables may be extended between the posts to facilitate deployment by allowing the wall to deploy like a shower curtain.

When water, waves, and floating debris impact the wall, the loads are transferred from the fabric into the posts and then into the ground. The posts can be straight beams or can be buttressed for additional bending strength and control of the loading. The flexible fabric wall can be constituted of one or several layers or different types of materials to provide protection from threats of all kinds including water pressure, wave action, floating debris impact, or even chemical threats. The Extendible Flexible Flood Barrier can follow any perimeter shape with positive and negative recesses, angular changes, or grade changes. It can be continuous and completely surround a structure, or simply bridge an opening and seal against the sides of the opening via the addition to sealing materials on the posts that abut the buildings.

The Extendible Flexible Flood Barrier can also be used as a containment device that keeps a fluid inside an area and prevents its escape. This could be in the form of a deployable wall around a location where hazardous materials are used and spills are required to be contained.

SUMMARY OF THE INVENTION

The extendible flexible flood barrier is a deployable wall that leverages the unique advantages of textile and membrane materials to advance the state of the art in flood mitigation devices.

The extendible flexible flood barrier is comprised of a textile and membrane wall that is attached to a vertical anchor post, a receiver post that the membrane wall is attached to when extended, and a storage container that is integral with the anchor post & holds the wall when stowed. The flexible wall also has a ground skirt extension which lies horizontally on the ground and has integral seals that are compressed by water weight and ballast or clamping bars to seal against the ground. Additional posts may be added to the wall to facilitate extension of its length to seal larger openings.

The flexible wall is folded and stored in its container until a potential flooding event is identified. At this time, the container is opened, the wall is extended and mated to the receiver post on the opposite side of the opening, and the flexible wall ground skirt is positioned. When deployed, the wall will prevent the passage of water under significant hydrostatic pressure (from zero to approximately twelve feet of pressure head). The wall terminates at the end posts under a clamping bar and seal, and against the ground with a ballasted skirt or with bolted clamping bars for a more secure attachment. A deadman assembly can be used in conjunction with the clamp to prevent pull-out of the flexible wall when under load. After the event is over, the wall is detached from the posts, folded and stored back in its container. The container and any other covers required can be closed with tamperproof fasteners if desired, and can also be load rated to act as bollards.

The wall assembly is stored adjacent to the opening at the point of use and is simple to deploy, so users can deploy their flood mitigation system quickly and as close to the flooding event as possible. This is important in high traffic applications such as transit systems or businesses, where down-time equates to lost revenue. Point of use storage excludes the potential for lost parts over time when items are stored remotely. It can be configured to use clamping bars that are bolted to receivers pre-mounted in the ground to ensure a high reliability system with no leakage. Most deployable systems cannot seal effectively to the ground because of surface roughness, cracks, and undulations in the surface, and therefore leak. This often results in the need for pumps to remove leakage water, and therefore power, which is often unavailable in storm and flooding events.

Longer walls can be deployed easily with the assistance of supporting cables that are deployed from anchor post to receiver post and support the flexible wall like a shower curtain during deployment. The ground skirt and ballast can be folded up against the wall and hooked to a cable to prevent the sliding of any of the wall on the ground during deployment. This enables one person to deploy a long wall. Intermediate posts can be deployed to support the wall between the end posts, or the wall can rest against pre-installed bollards.

The wall assembly can be designed to form a perimeter around a structure of any shape, and can include concave and convex features. It can be deployed on slopes, across curbs, and over irregular surfaces. The wall can be a single span across an opening or it can have intermediate deployable posts that can be bolted to the ground, or use fixed bollards to support the wall. If the reaction loads on the posts become prohibitive then a deployable buttress can be added to direct loads to the landing point of the buttress and greatly reduce the loads induced on the base mount. The spacing of the posts can also be altered to increase the strength of the wall when spaced close together, or reduce the cost of the wall by spreading them apart.

The flexible wall assembly can prevent impingement of the wall, and thus force of the water, on the structure it is protecting (glass windows, etc.). This can be done by positioning the mounting points away from the structure, or by angling the posts away from the structure if the trench or storage container is near the structure. Independent flexible members (rope, cable, etc.) can be strung between the posts to aid deployment and limit motion in the wind once deployed.

The flexible wall system can abut and seal against structures such as buildings, walls, or doorways. This is accomplished by adding a seal between the end posts and the building. The flexible wall can also have interruptions so passageways can be created that will allow the flow of pedestrian traffic until the last possible minute when sealing the wall is required. This is possible because the wall can start or stop at intermediate posts through the use of an overlapping wall clamping and sealing system on these posts. This is comprised, of the flexible wall with a deadman assembly, being captured by a clamp on the posts. The deadman is a flexible assembly that is larger than the gap between the posts and therefore will not slip between the posts and is therefore fully captured. Face seals on the posts in this area prevent leakage past the joined wall sections.

A second aspect of the invention is the use of the same, or similar but less structural version, to be used as a protective barrier against human or vehicular traffic flow, wind, flying objects, etc. The functionality of the system is the same, but the forces on the system are potentially lower in these cases so different materials could be used.

DETAILED DESCRIPTION

Figure 1:
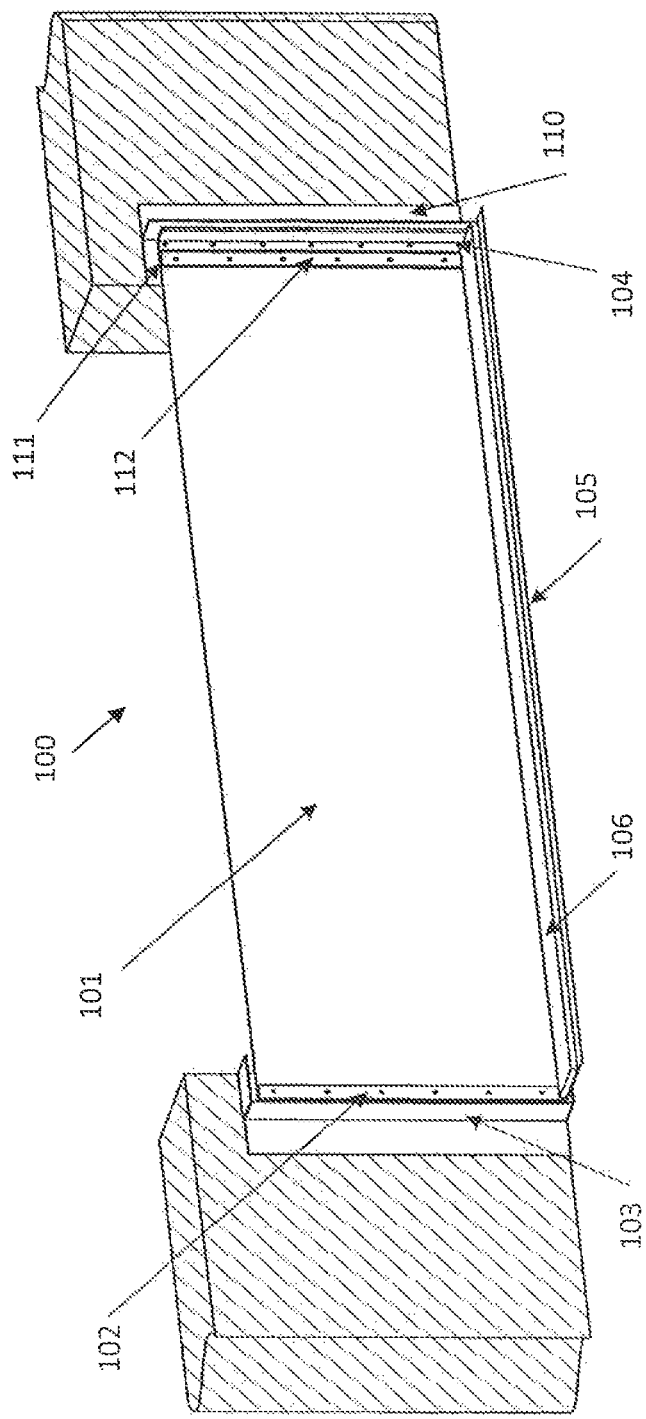
FIG. 1 illustrates the extendible flexible flood barrier assembly with the flexible membrane deployed.
Figure 2:
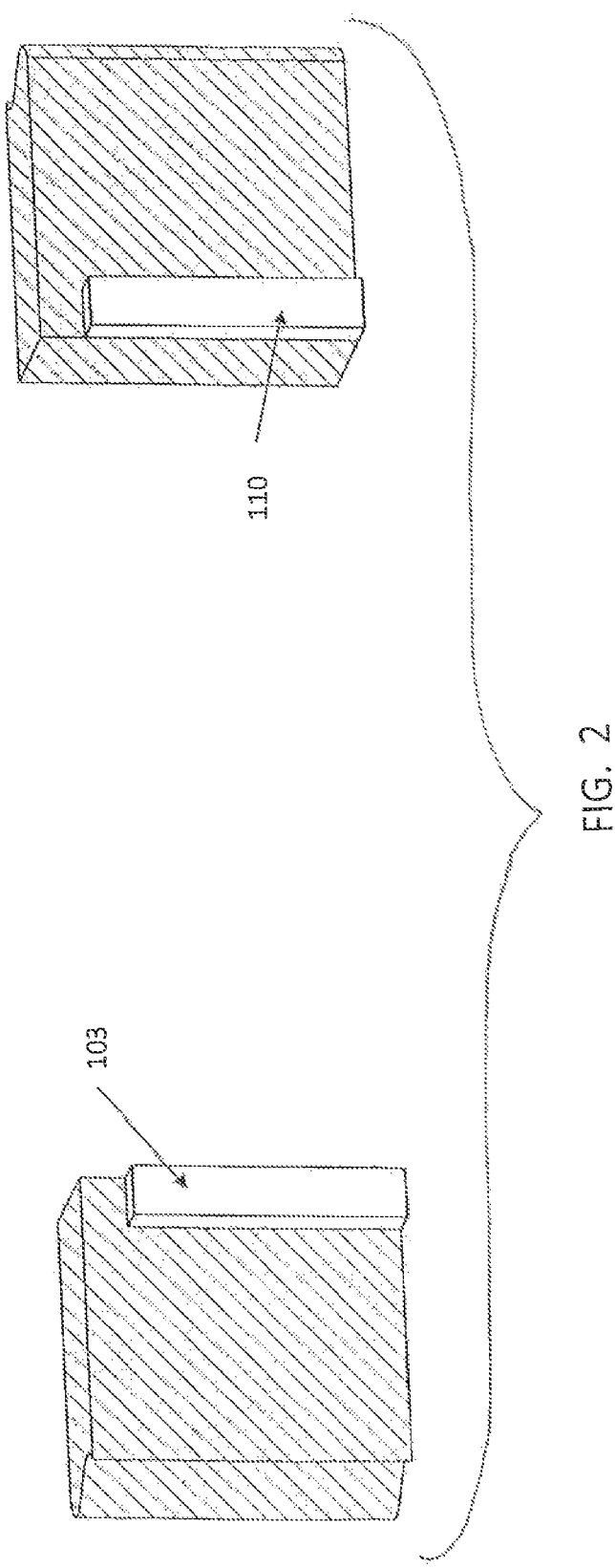
FIG. 2 illustrates the extendible flexible flood barrier with the flexible membrane stowed.
Figure 3A:
FIGS. 3A-3D illustrates several potential constructions of the flexible membrane.
Figure 3B:
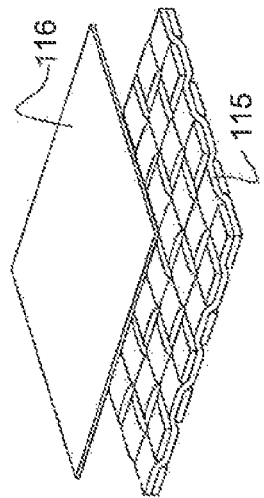
Figure 3C:
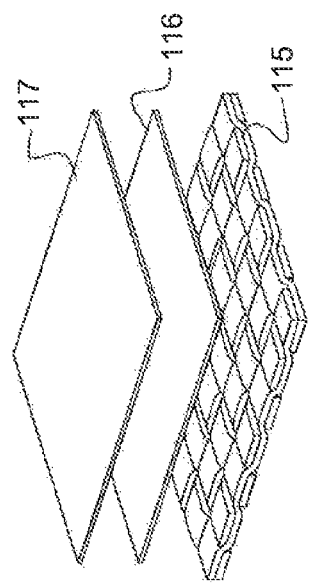
Figure 3D:
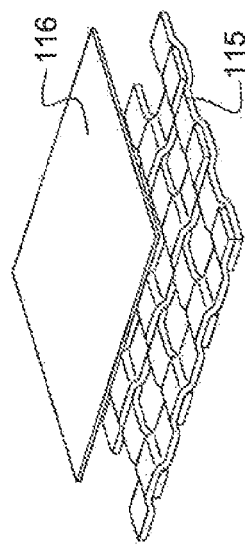
Figure 4:
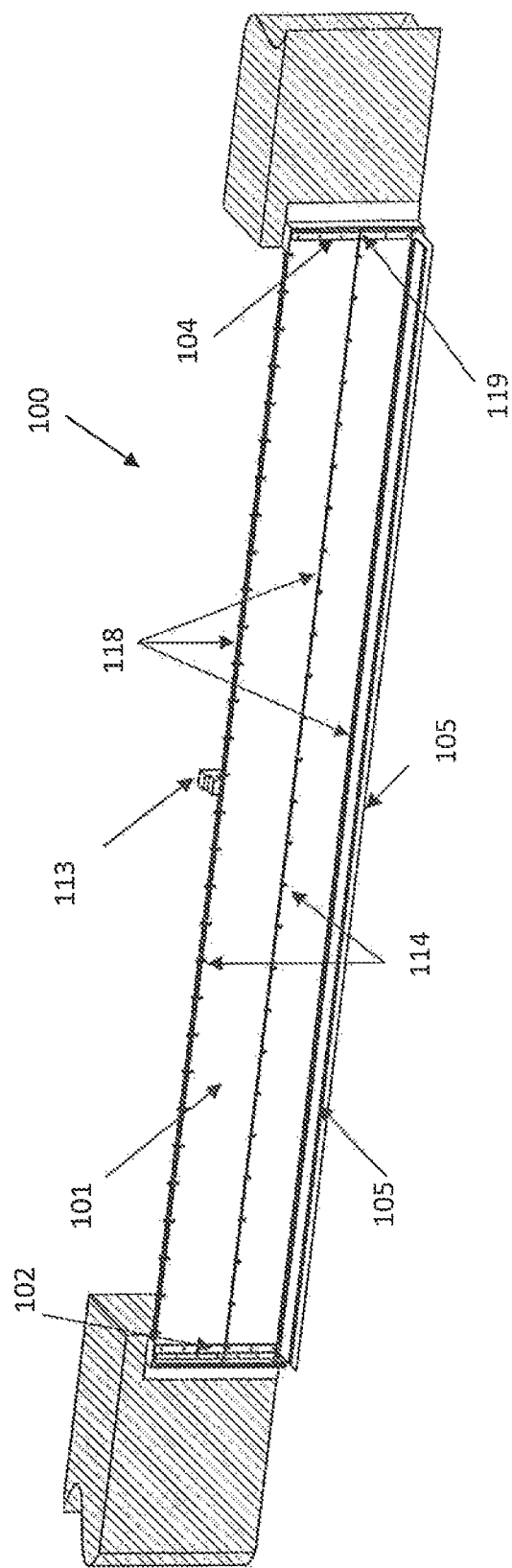
FIG. 4 illustrates the use of tensioned cable & intermediate posts to facilitate longer extendible flexible flood barriers.
Figure 5A:
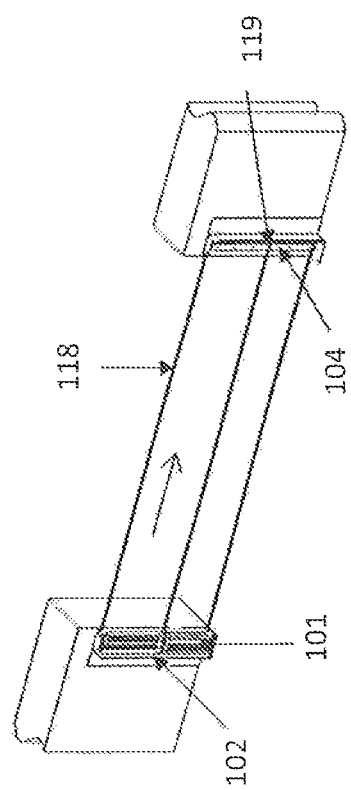
FIGS. 5A-5C illustrates the deployment of a long extendible flexible flood barrier using cable guides.
Figure 5B:
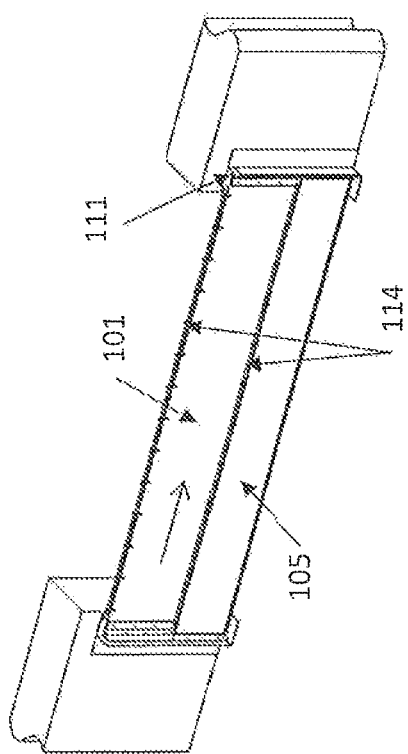
Figure 5C:
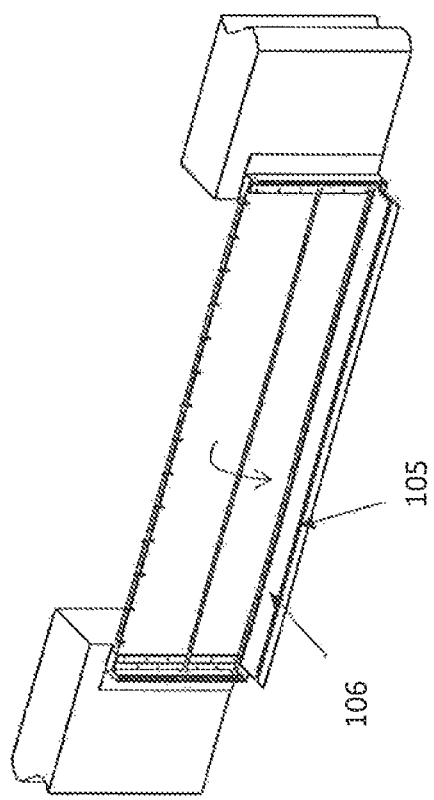
Figure 6:
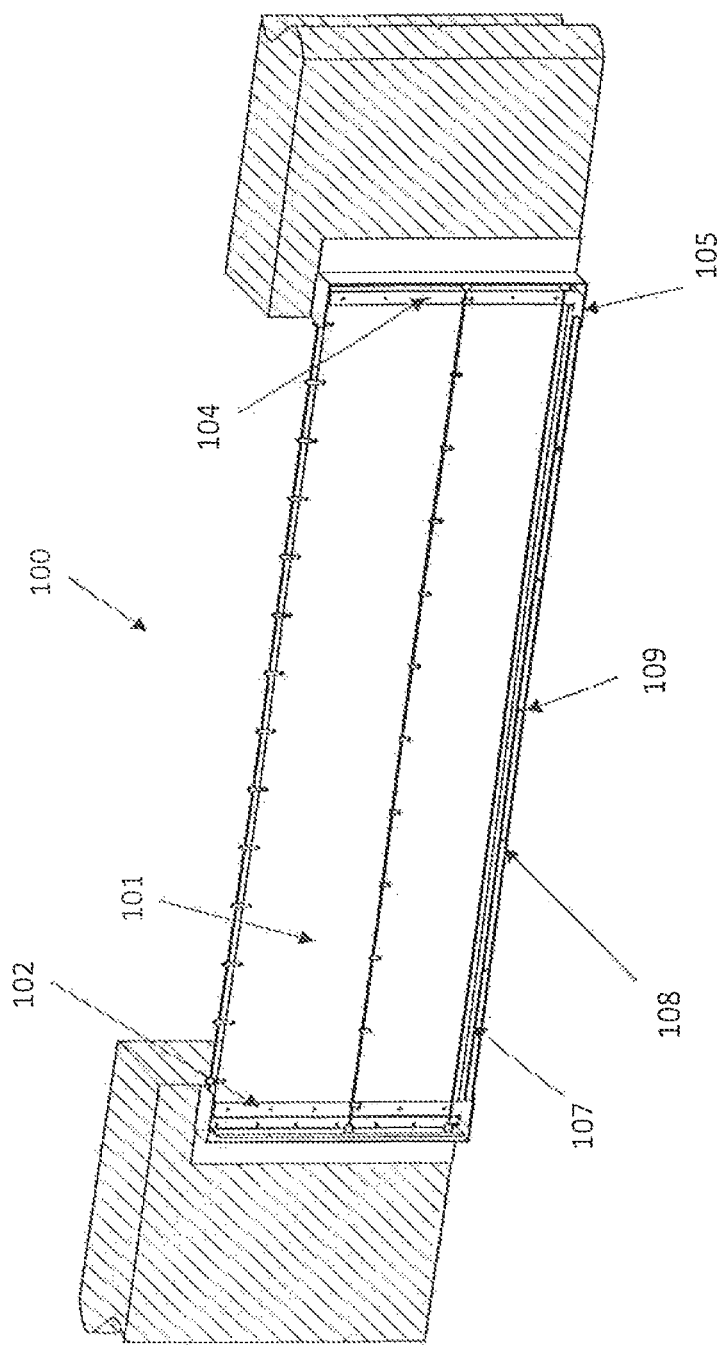
FIG. 6 illustrates the use of anchors to fix the ground skirt to the ground; and, FIG. 7 illustrates the ability to include angles in the membrane wall.
Figure 7:
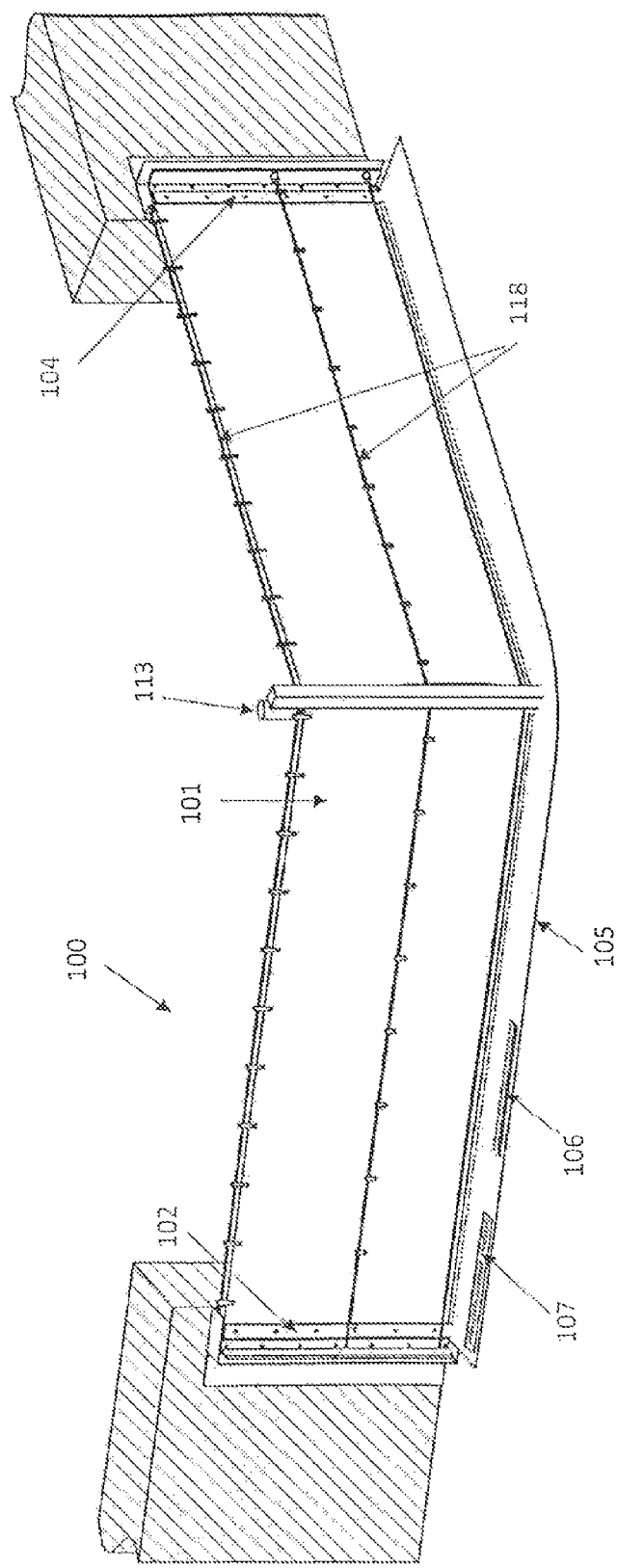

FIG. 1 illustrates a perspective view of the extendible flexible flood barrier 100 with the flexible membrane in the deployed position according to an embodiment of the present invention. FIG. 2 illustrates the extendible flexible flood barrier 100 in its stowed condition. FIGS. 3A-3D illustrates several potential constructions of the flexible membrane portion of the extendible flexible flood barrier 100. FIG. 4 illustrates the use of tensioned cables 118 and intermediate posts 113 to facilitate longer extendible flexible flood barriers 100. FIGS. 5A-5C is an illustration of the deployment of a long extendible flexible flood barrier 100 using cable guides clips 114. FIG. 6 illustrates the use of anchors 107, 108, 109 to fix the ground skirt of the extendible flexible flood barrier 100 to the ground. FIG. 7 illustrates the ability to include angles in the membrane wall of the extendible flexible flood barrier 100.

As shown in FIGS. 1 and 2, the extendible flexible flood barrier 100 is comprised of a textile and flexible membrane wall 101, an anchor post 102, a storage container 103, a receiver post 104, a ground skirt 105, ballast 106, a receiver cover 110, mounting seals 111, and mounting plate 112.

The flexible membrane 101 wall is folded and stored in the container 103 and can be moved from a stowed to a deployed position and visa-versa. The flexible membrane 101 is attached to the anchor post 102 with bolts that compress mounting seals 111 and possibly the use of a deadman termination to the flexible wall 101, to prevent pull-out from the mounting plate 112. The mounting plate 112 provides a leak-free seal between the flexible wall 101 and the anchor post 102. A gasket seal 111 is situated between the mounting plate 112, and the structure to provide a leak-free seal when compressed by bolts. In order to deploy the flexible wall 101, the container 103 must first be removed or opened. The flexible wall 101 is then pulled horizontally and attached to the receiver post 104 with a mounting plate 112 and mounting seal 111 and bolts. Water impinging on the flexible membrane 101 drives the load into the posts 102 and 104, and then into the receivers ground or adjacent structure such as a building. The flexible membrane 101 can be stowed in a number of ways including rolling or folding. In an alternative embodiment, the container 103 can be substituted by a trench cast from concrete, built up of brick and/or block, which is formed directly into the surrounding ground surface or floor and covered by a door. All of the aforementioned components 101-102, 104, 111-112 can be stowed or arranged for use in the trench in a manner similar to that described with relation to the container 103.

As shown in FIG. 3 the flexible wall 101 is comprised of one or multiple layers of membranes 116, webbing assemblies 115, and possibly protective layers 117 depending on the loading from hydrostatic pressure and damage threats. A protective layer 117 may be added to improve resiliency to the flexible wall 101 if rough handling or impacts are anticipated. The webbings 115 can be joined at regular intervals via stitching, sealing, bonding or some similar activity. The webbing 115 can be coated or impregnated with plastic or elastomeric coatings, or is can be uncoated. The membrane 116 is positioned adjacent to the webbing 115 assembly and is oversized to ensure load transfer in the webbing 115 assembly. The membrane 116 is an impermeable layer that retains the fluid. The membrane can be any number of materials including polymer coated fabrics, elastomeric sheets, plastic films, etc.

The flexible membrane 101 can be terminated at an intermediate post 113 by retaining it with a mounting plate 112 on the post, or a clamping plate on the post. A mounting seal 111 on the post will seal the flexible membrane 101 to prevent water pass by. A deadman termination can be added to the ends of the wall to prevent pull-out from the mounting plate 112 when the wall is loaded. This clamping arrangement can be used to create a doorway along the span, create a join at a corner, or any other configuration required where the flexible wall 101 needs to be terminated or two flexible walls 101 joined in a leak-free assembly.

FIG. 4 shows the use of tensioned cables 118, and intermediate posts or bollards 113 to facilitate longer extendible flexible flood barriers 100. The tensioned cables 118 are tensioned by tensioning spools 119 that can be located on the anchor post 102 or the receiver post 104. The flexible membrane wall 101 is attached to the tensioned cables with cable clips 114 on which it slides during deployment from the container 103. FIG. 5 illustrates the deployment process including the release of the ground skirt 105 from the tensioned cables 118 by opening the cable clips 114.

FIG. 7 illustrates the ability to include angles in the membrane wall 101 of a long flexible flood barrier 100 with an intermediate post 113 or a bollard to support the center span of the flexible wall 101.

FIGS. 5A-5C illustrates the deployment of the extendible flexible flood wall. In FIG. 5A the cables 118 are extended in the direction of the arrow and tensioned by tensioning spools 119. FIG. 5B illustrates the deployment of the flexible wall 101 in the direction of the arrow. The ground skirt 105 can be seen in FIG. 5A as folded against flexible wall 101. In FIG. 5C, the ground skirt 105 can be seen being rotated in the direction of the arrow to deploy the ground skirt 105 in a horizontal position and ballast 106 placed atop the ground skirt 105.

The flexible wall is stored in a container on one side of the opening to be protected and extended to the receiver on the opposite of the opening to deploy the barrier. Structural members, such as posts or a building itself will react to the load from the flood water impinging on the wall. Intermediate posts or bollards can be added to lengthen the wall so larger spans can be closed-off with the flexible wall. The flexible will can be configured for use in many applications including entire buildings, building entrances, transit system passages, such as ventilation shafts or elevator shafts, stairwells, and other openings that can be threatened by flooding. It can be continuous such that it surrounds structures such as buildings and power substations, homes, or segmented such that it can be used to seal openings of all kinds including human or vehicle doorways. It can be tailored to fit any opening or water height, and can adapt to local changes in elevation because of its flexible nature.

It will be apparent to those persons skilled in the art, upon reading my description of the invention described herein, that various modifications and alterations of the disclosed embodiments can be envisioned and implemented without departing from the scope and spirit of the appended claims.

We claim:

1. An extendible flexible flood barrier comprising:
   a flexible wall comprising at least one membrane component and at least one textile component, said flexible wall being attached to a vertical anchor post with a mounting plate;
   a storage container that is integral with the anchor post and holds the flexible wall when stowed;
   a receiver post that the flexible wall is attached to with a mounting plate when extended; and,
   a ground skirt, said ground skirt comprising an extension of the flexible wall, the ground skirt lays horizontally on the ground when the flexible wall is deployed in a vertical orientation.

2. The flexible flood barrier of claim 1, wherein the wall provides both fluid retention and structural support to restrain static and dynamic fluid pressure, and floating debris impacts.

3. The flexible flood barrier of claim 2, wherein the textile comprises a fabric and at least one member from the group consisting of webbings, straps, belts and tapes for structural support.

4. The flexible flood barrier of claim 3, wherein at least two members selected from the group consisting of webbings, straps, belts and tapes are connected to one another by stitching, welding, bonding or similar means.

5. The flexible flood barrier of claim 1, where the flexible wall facilitates rolling or folding for storage.

6. The flexible flood barrier of claim 1, where the flexible wall is sealed to the anchor and receiver posts and to the ground to prevent the passage of fluid.

7. The flexible flood barrier of claim 1, wherein additional fixed or removable posts are added between the anchor and receiver posts to facilitate longer or taller walls.

8. The flexible flood barrier of claim 1, further comprising at least one end post, wherein, the at least one end post is sealed to the perimeter of an opening which the extendable wall is blocking from flooding.

9. The flexible flood barrier of claim 1, wherein independent flexible walls can be joined and sealed at an intermediate clamping post.

10. The flexible flood barrier of claim 1, wherein a ballast is integral to the extension of the flexible wall to hold the ground skirt in place in wind and water loading.

11. The flexible flood barrier of claim 1, where segmented clamping bars are added to the extension of the flexible wall for anchoring to the ground to hold the flexible wall in place in high winds.

12. The flexible flood barrier of claim 1, wherein the posts are constructed from at least one material from the group consisting of metal, plastic and composite materials.

13. The flexible flood barrier of claim 1, wherein the posts are straight or tapered and of any cross-sectional shape.

14. The flexible flood barrier of claim 1, wherein the posts are angled and of any cross-sectional shape.

15. The flexible flood barrier of claim 1, wherein the posts are buttressed and of any cross-sectional shape.

16. The flexible flood barrier of claim 1, wherein the posts are extendible in length.

17. The flexible flood barrier of claim 1, wherein the flexible wall can be positioned in any orientation to surround a building or structure of any shape.

18. The flood barrier of claim 1, wherein the flexible wall can be sealed against at least one selected from the group consisting of a structure, a building, and an opening.

19. The flexible flood barrier of claim 1, wherein the flexible wall can be used to stop any fluid, or influence or guide the flow of people or vehicles.

20. The flexible flood barrier of claim 1, further comprising at least two end posts, wherein the flexible wall is supported by tensioned cables that span between the end posts during deployment and operation.

\* \* \* \* \*